US008399547B2

(12) United States Patent
Meyer et al.

(10) Patent No.: US 8,399,547 B2
(45) Date of Patent: Mar. 19, 2013

(54) POLYMER COMPOSITION WITH HEAT-ABSORBING PROPERTIES AND HIGH STABILITY

(75) Inventors: Alexander Meyer, Düsseldorf (DE); Rolf Wehrmann, Krefeld (DE); Anke Boumans, Goch (DE); Michael Erkelenz, Duisburg (DE)

(73) Assignee: Bayer MaterialScience AG (DE)

( * ) Notice: Subject to any disclaimer, the term of this patent is extended or adjusted under 35 U.S.C. 154(b) by 0 days.

(21) Appl. No.: 12/966,094

(22) Filed: Dec. 13, 2010

(65) Prior Publication Data

US 2011/0144250 A1 Jun. 16, 2011

(30) Foreign Application Priority Data

Dec. 15, 2009 (DE) .................. 10 2009 058 200

(51) Int. Cl.
*C08K 5/50* (2006.01)

(52) U.S. Cl. ......... 524/154; 524/406; 524/430; 523/351

(58) Field of Classification Search ............... 524/154, 524/406, 430; 523/351
See application file for complete search history.

(56) References Cited

U.S. PATENT DOCUMENTS

| | | | |
|---|---|---|---|
| 2,991,273 | A | 7/1961 | Hechelhammer et al. |
| 2,999,825 | A | 9/1961 | Floyd et al. |
| 2,999,846 | A | 9/1961 | Schnell et al. |
| 3,028,635 | A | 4/1962 | Herubel |
| 3,148,172 | A | 9/1964 | Fox |
| 4,101,513 | A | 7/1978 | Fox et al. |
| 4,395,463 | A | 7/1983 | Kray |
| 4,707,393 | A | 11/1987 | Vetter |
| 4,982,014 | A | 1/1991 | Freitag et al. |
| 5,041,313 | A | 8/1991 | Patel |
| 5,126,428 | A | 6/1992 | Freitag et al. |
| 5,227,458 | A | 7/1993 | Freitag et al. |
| 5,288,778 | A | 2/1994 | Schmitter et al. |
| 5,391,795 | A | 2/1995 | Pickett |
| 5,627,256 | A | 5/1997 | Meier et al. |
| 5,712,332 | A | 1/1998 | Kaieda et al. |
| 5,821,380 | A | 10/1998 | Holderbaum et al. |
| 5,846,659 | A | 12/1998 | Lower et al. |
| 5,869,185 | A | 2/1999 | Bahr et al. |
| 5,883,165 | A | 3/1999 | Krohnke et al. |
| 6,350,512 | B1 | 2/2002 | Hurley et al. |
| 6,680,350 | B1 | 1/2004 | Dobler |
| 7,399,571 | B2 | 7/2008 | Bogerd et al. |
| 7,442,430 | B2 | 10/2008 | Buckel et al. |
| 2003/0022967 | A1 | 1/2003 | Dobler et al. |
| 2006/0178254 | A1 | 8/2006 | Takeda et al. |
| 2006/0251996 | A1 | 11/2006 | Bogerd et al. |

FOREIGN PATENT DOCUMENTS

| | | |
|---|---|---|
| DE | 1570703 A1 | 2/1970 |
| DE | 2036052 A1 | 1/1972 |
| DE | 2063050 A1 | 7/1972 |
| DE | 2211956 A1 | 10/1973 |
| DE | 2804283 A1 | 8/1978 |
| DE | 3121385 A1 | 8/1982 |
| DE | 3832396 A1 | 2/1990 |
| EP | 0110221 A2 | 6/1984 |
| EP | 0110238 A2 | 6/1984 |
| EP | 0500496 A1 | 8/1992 |
| EP | 0570165 A2 | 11/1993 |
| EP | 0716919 A2 | 6/1996 |
| EP | 0718354 A2 | 6/1996 |
| EP | 0839623 A1 | 5/1998 |
| EP | 1266931 A1 | 12/2002 |
| EP | 1308084 A1 | 5/2003 |
| EP | 1559743 A1 | 8/2005 |
| EP | 1724110 | 11/2006 |
| EP | 1801815 A1 | 6/2007 |
| FR | 1561518 A | 3/1969 |
| GB | 1122003 A | 7/1968 |
| GB | 1229482 A | 4/1971 |
| GB | 1341318 A | 12/1973 |
| GB | 1367790 A | 9/1974 |
| JP | 06240146 A | 8/1994 |
| JP | 2006-219662 A | 8/2006 |
| JP | 2008-024902 A | 2/2008 |
| JP | 2008-150548 A | 7/2008 |
| JP | 2008-214596 A | 9/2008 |
| WO | WO-96/15102 A2 | 5/1996 |
| WO | WO-01/18101 A1 | 3/2001 |
| WO | WO-2005/037932 A1 | 4/2005 |
| WO | WO-2006/108520 A1 | 10/2006 |
| WO | WO-2008/071363 A2 | 6/2008 |
| WO | WO-2008/109072 A1 | 9/2008 |
| WO | WO-2009/059901 A2 | 5/2009 |
| WO | WO 2010/090893 | * 9/2010 |

* cited by examiner

*Primary Examiner* — Peter Szekely
(74) *Attorney, Agent, or Firm* — Novak Druce Connolly Bove + Quigg LLP

(57) ABSTRACT

The present invention relates to a heat-absorbing polymer composition containing a transparent thermoplastic synthetic substance, an inorganic infrared absorber with stabilizer and also to the production and use of the polymer compositions according to the invention and to the products produced therefrom. In particular, the present invention relates to the stabilization of inorganic IR absorbers from the group of the tungsten compounds and also to the use of the polymer composition according to the invention containing these stabilized inorganic IR absorbers for the purpose of producing windowpanes for use in buildings, motor vehicles, rail vehicles or aircraft.

16 Claims, No Drawings

POLYMER COMPOSITION WITH HEAT-ABSORBING PROPERTIES AND HIGH STABILITY

CROSS-REFERENCE TO RELATED APPLICATIONS

This application claims benefit to German Patent Application No. 10 2009 058 200.2, filed Dec. 15, 2009, which is incorporated herein by reference in its entirety for all useful purposes.

FIELD OF THE INVENTION

The invention relates to a heat-absorbing polymer composition containing a transparent thermoplastic synthetic substance, an inorganic infrared absorber with a stabiliser, and also to the production and use of the polymer compositions according to the invention and to the products produced therefrom. In particular, the present invention relates to the stabilisation of inorganic IR absorbers from the group of the tungsten compounds and also to the use of the polymer composition according to the invention containing these stabilised inorganic IR absorbers for the purpose of producing windowpanes for use in buildings, motor vehicles, rail vehicles or aircraft.

BACKGROUND OF THE INVENTION

Glazings consisting of compositions containing transparent thermoplastic polymers such as polycarbonate, for example, offer many advantages for the vehicle domain and for buildings, compared to conventional glazings consisting of glass. These advantages include, for example, increased fracture resistance or saving of weight, which in the case of automobile glazings enable higher occupant safety in the event of traffic accidents, and a lower fuel consumption. Lastly, transparent materials that contain transparent thermoplastic polymers permit a significantly greater design freedom by reason of their simpler mouldability.

A disadvantageous aspect, however, is that the high diathermancy (i.e. permeability in respect of IR radiation) of transparent thermoplastic polymers leads, in the case of solar influence, to an undesirable heating in the interior of vehicles and buildings. The increased temperatures in the interior reduce the comfort for the occupants or inhabitants and may entail increased demands on the air conditioning, which in turn intensify the energy consumption and in this way cancel out the positive effects. In order nonetheless to take into account the demand for low energy consumption combined with a high degree of comfort for the occupant, windowpanes are required that provide an appropriate thermal-protection. This applies, in particular, to the automobile domain.

As generally known the greatest part of the solar energy is apportioned both to the visible region of light between 400 nm and 750 nm and to the region of the near infrared (NIR) between 750 nm and 2500 nm. Penetrating solar radiation is, for example, absorbed in the interior of an automobile and emitted as long-wave thermal radiation with a wavelength from 5 μm to 15 μm. Since in this region customary glazing materials—in particular, thermoplastic polymers that are transparent in the visible region—are not transparent, the thermal radiation cannot radiate outwards. A greenhouse effect is obtained, and the interior space heats up. In order to keep this effect as small as possible, the transmission of the glazings in the NIR should therefore be minimised as far as possible. However, customary transparent thermoplastic polymers—such as polycarbonates, for example—are transparent both in the visible region and in the NIR.

Therefore admixtures, for example, are needed that exhibit a transparency in the NIR that is as low as possible without disadvantageously influencing the transparency in the visible region of the spectrum.

Amongst the transparent thermoplastic synthetic substances, polymers based on polymethyl methacrylate (PMMA) and polycarbonate are particularly well suited for use as glazing material. By reason of its high toughness, polycarbonate in particular possesses a very good property profile for end uses of such a type.

In order to impart heat-absorbing properties to these synthetic substances, appropriate infrared absorbers are therefore employed as additives. Particularly of interest for this purpose are IR-absorber systems that are provided with a broad absorption spectrum in the NIR region (near infrared, 750 nm-2500 nm) with, at the same time, low absorption in the visible region (slight intrinsic colour). Furthermore, the corresponding polymer compositions exhibit a high thermostability and also an excellent light stability.

A large number of IR absorbers based on organic or inorganic materials are known that can be employed in transparent thermoplastics. A selection of materials of such a type is described, for example, in J. Fabian, H. Nakazumi, H. Matsuoka, Chem. Rev. 92, 1197 (1992), in U.S. Pat. No. 5,712, 332 or JP-A 06240146.

However, IR-absorbing additives based on organic materials frequently have the disadvantage that they exhibit slight stability in relation to thermal loading or irradiation. Accordingly, many of these additives are not sufficiently thermally stable to be worked into transparent thermoplastics, since temperatures up to 330° C. are required in the course of their processing. Furthermore, in use the glazings are often exposed over lengthy periods to temperatures of more than 50° C., caused by the solar radiation, which may result in the decomposition or degradation of the organic absorbents.

Furthermore, the organic IR absorbers frequently do not exhibit a sufficiently broad absorption band in the NIR region, so that their use as IR absorbers in glazing materials is inefficient. Moreover, a strong intrinsic colour of these systems often also arises, which as a rule is undesirable.

In comparison with organic additives, IR-absorbing additives based on inorganic materials are frequently distinctly more stable. The use of these systems is often also more economical, since in most cases they exhibit a distinctly more favourable cost/performance ratio. Accordingly, materials based on fine-particle borides, such as lanthanum hexaboride for example, have proved to be efficient IR absorbers, since they are provided with a broad absorption band combined with a high thermostability. Such borides based on La, Ce, Pr, Nd, Tb, Dy, Ho, Y, Sm, Eu, Er, Tm, Yb, Lu, Sr, Ti, Zr, Hf, V, Ta, Cr, Mo, W and Ca are described, for example, in DE 103 92 543 T5 or EP 1 559 743 A1.

A disadvantage of these additives, however, is their significant intrinsic colour. After being worked in, the boride-containing additives impart a characteristic green colouration to the transparent synthetic substance, which is frequently undesirable, since it greatly restricts the scope for a neutral colouring.

For the purpose of compensating for the intrinsic colour, often relative large quantities of further colouring agents are employed, which, however, impairs the optical properties of the composition and results in a distinctly diminished transmission in the visible region. Particularly in the case of vehicle glazings this is undesirable or—in special cases in which the view of the driver must not be impaired-impermissible.

Furthermore, IR-absorbing additives from the group of the tungsten compounds are known that provide a lower self-absorption in the visible spectral region in comparison with the inorganic IR absorbers based on boride that are known from the state of the art.

The production and use of these substances in thermoplastic materials are described, for example; in H. Takeda, K. Adachi, J. Am. Ceram. Soc. 90, 4059-4061, (2007), WO 2005/037932 A1, JP 2006 219662 A, JP 2008 024902 A, JP 2008 150548 A, WO 2009/059901 A2 and JP 2008 214596 A. However, the deficient long-term stability in relation to thermal loading turned out to be disadvantageous. Whereas the thermal instability of tungsten oxides is known as such and has been described, for example, in Romanyuk et al.; J. Phys. Chem. C 2008, 112, 11090-11092, it became evident also in the case where these compounds are worked into a polymer matrix that in the course of thermal storage at elevated temperature of the corresponding polymer compositions—such as, for example, in the case of a polycarbonate composition—the absorption in the IR region declines significantly.

For an application of the compositions in the glazing field, in particular for car glazings, it is, however, absolutely essential that the corresponding IR-absorbing polymer compositions exhibit a long-term stability in relation to higher temperatures. By the term 'higher temperatures', temperatures are meant, for example, that an article consisting of polycarbonate may assume in the case of intense solar radiation (for example, 50° C.-110° C.). Furthermore, it has to be guaranteed that the compositions can be processed under conventional process conditions without the IR-absorbing properties being diminished as a result.

Furthermore, for the purpose of improving the processing properties in thermoplastic materials it was known to use thermostabilisers such as, for example, phosphites, hindered phenols, aromatic, aliphatic or aliphatic/aromatic phosphines, lactones, thioethers and hindered amines (HALS, hindered amine light stabilizers).

From WO-A 01/18101 moulding compounds containing a thermoplastic synthetic substance and a phthalocyanine dye or naphthalocyanine dye are known which for the purpose of improving the processing stability may contain antioxidants such as phosphites, hindered phenols, aromatic, aliphatic or mixed phosphines, lactones, thioethers and hindered amines. In contrast, the present invention relates to compositions containing inorganic IR absorbers based on tungsten.

From EP 1 266 931 A1 organic IR absorbers in polycarbonate compositions are known in combination with phosphines. However, no reference to the combination of inorganic IR absorbers—in particular, inorganic IR absorbers based on tungsten—with phosphines for the purpose of stabilising the absorbers in a thermoplastic matrix is described in EP 1 266 931 A1.

In EP 1 559 743 A1 polycarbonate compositions are described containing inorganic IR absorbers based on borides in combination with thermostabilisers such as phosphonites and phosphines, these additives serving for stabilising the polycarbonate matrix. Tungsten-based compositions are not described. It is not known that the aforementioned stabilisers have an influence on inorganic IR absorbers.

US 2006/0251996 A1 discloses multi-layer sheets containing a core layer containing a thermoplastic polymer and an IR-absorbing additive, the IR-absorbing additive being a metal oxide. Furthermore, the core layer may additionally contain thermostabilisers. A polymer composition with an IR absorber stabilised by phosphine according to the present invention and also master batches stabilised with phosphines are, however, not described in US 2006/0251996 A1. In particular, US 2006/0251996 A1 also does not describe the use of a nanoscale IR absorber embedded in a dispersing agent.

But in all the thermoplastic compositions with IR absorbers that have been published hitherto, the thermostabiliser serves exclusively for stabilising the respective polymer matrix—particularly in the course of processing. Accordingly, through the use of these systems the yellow colouration of the polycarbonate after exposure to light, as described in EP 1 266 931 A1, can be limited.

The object was therefore to find IR-absorbing systems with low intrinsic colour and also with, at the same time, high thermostability and stability in relation to exposure to light, and to make available corresponding compositions with thermoplastic materials. At the same time, these additives are to be provided with a broad absorption characteristic in the NIR region, whilst they exhibit an economically justifiable or even interesting cost/performance ratio. A further object of the present invention was to provide stabilisers that distinctly improve the long-term stability of known IR absorbers, and also the provision of compositions with IR absorber and stabiliser in high concentration in a thermoplastic polymer by way of master batch for further processing.

Surprisingly, it became evident that certain stabilisers improve the thermostability of IR-absorbing tungstates, in particular that of caesium tungstate, so that the object of the present invention is achieved by compositions with IR-absorbing additives from the group of the tungstates, which are provided with a lower self-absorption in the visible spectral region in comparison with the inorganic IR absorbers based on boride that are known from the state of the art, and result in thermoplastic materials with slighter intrinsic colour, in which the inorganic IR absorbers are stabilised with a stabiliser from the group of the phosphines for a higher long-term stability in relation to thermal loading.

EMBODIMENTS OF THE INVENTION

An embodiment of the present invention is a polymer composition comprising
a) a transparent thermoplastic synthetic substance;
b) an inorganic IR absorber comprising caesium tungstate; and
c) a phosphine-based stabiliser.

Another embodiment of the present invention is the above composition, wherein the phosphine-based stabiliser comprises a compound selected from the group consisting of aliphatic phosphines, aromatic phosphines, aliphatic/aromatic phosphines, and mixtures thereof.

Another embodiment of the present invention is the above composition, wherein the phosphine-based stabiliser comprises a compound selected from the group consisting of triphenylphosphine, trialkylphenylphosphine, bisdiphenylphosphinoethane, trinaphthylphosphine, and mixtures thereof.

Another embodiment of the present invention is the above composition, wherein the phosphine-based stabiliser is present in an amount of from 0.01 wt. % to 0.20 wt. %, relative to the overall composition.

Another embodiment of the present invention is the above composition, wherein the infrared absorber with a solids content based on tungstate is present in an amount of from 0.0001 wt. %-10 wt. %, relative to the overall composition.

Another embodiment of the present invention is the above composition, wherein the transparent thermoplastic synthetic substance is selected from the group consisting of polymethyl methacrylates, polycarbonates, and copolycarbonates.

Another embodiment of the present invention is the above composition, wherein the composition comprises at least one further IR absorber.

Another embodiment of the present invention is the above composition, wherein the composition comprises at least on further IR absorber selected from the group consisting of borides and tin oxides.

Another embodiment of the present invention is the above composition, wherein the composition further comprises a compound selected from the group consisting of ultraviolet absorbers, colouring agents, mould-release agents, flame-proofing agents, thermostabilisers, and combinations thereof.

Yet another embodiment of the present invention is a master batch comprising
- a) from 85.00 wt. % to 98.89 wt. % of a transparent thermoplastic synthetic substance;
- b) from 0.1 wt. % to 2.0 wt. % of a tungstate as inorganic IR absorber;
- c) from 1.0 wt. % to 4.8 wt. % of a dispersing agent;
- d) from 0.01 wt. % to 0.20 wt. % of a phosphine-based stabiliser;
- e) from 0 to 8.0 wt. % of at least one further auxiliary substance and/or additive;

wherein, the sum of components a) through e) add up to 100 wt. %.

Another embodiment of the present invention is the above masterbatch, wherein the transparent thermoplastic synthetic substance is present an amount of 93.00 wt % to 98.89 wt. %.

Another embodiment of the present invention is the above masterbatch, wherein the tungstate as inorganic IR absorber is $Cs_{0.33}WO_3$.

Another embodiment of the present invention is the above masterbatch, wherein the phosphine-based stabiliser is triphenylphosphine.

Another embodiment of the present invention is the above masterbatch, wherein the at least one further auxiliary substance and/or additive comprises zirconium dioxide.

Another embodiment of the present invention is the above masterbatch, wherein the inorganic IR absorber is present in an acrylate matrix; the transparent thermoplastic synthetic substance is a polycarbonate; and the stabiliser is triphenylphosphine.

Yet another embodiment of the present invention is a polymer composition comprising:
- a) a transparent thermoplastic synthetic substance;
- b) an inorganic IR absorber comprising tungstate;
- c) a phosphine-based stabiliser; and
- d) a phosphite-based stabiliser.

Yet another embodiment of the present invention is an automobile glazing or an architectural glazing comprising the above composition.

Yet another embodiment of the present invention is a process for producing a polymer composition, comprising:
- a) producing a master batch comprising:
  - i) a transparent thermoplastic synthetic substance;
  - ii) an IR absorber comprising tungstate in an acrylate matrix; and
  - iii) a phosphine-based stabiliser;
- b. mixing the master batch in an extruder, wherein the transparent thermoplastic synthetic substance is fused during mixing.

DETAILED DESCRIPTION OF THE INVENTION

The present invention relates to compositions with IR-absorbing additives from the group of the tungstates, which are provided with a lower self-absorption in the visible spectral region in comparison with the inorganic IR absorbers based on boride that are known from the state of the art, and result in thermoplastic materials with slighter intrinsic colour, in which the inorganic IR absorbers are stabilised with a stabiliser from the group of the phosphines for a higher long-term stability in relation to thermal loading. Tungstates according to the present invention are of the type b1) $W_yO_z$ (W=tungsten, O=oxygen; $z/y$=2.20-2.99) and/or
b2) $M_xW_yO_z$ (M=H, He, alkali metal, alkaline-earth metal, metal from the group of the rare earths, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi; $x/y$=0.001-1.000; $z/y$=2.2-3.0), whereby the elements H, Cs, Rb, K, Tl, In, Ba, Li, Ca, Sr, Fe and Sn are preferred as M, whereby of these Cs is quite particularly preferred. Particularly preferred are $Ba_{0.33}WO_3$, $Tl_{0.33}WO_3$, $K_{0.33}WO_3$, $Rb_{0.33}WO_3$, $Cs_{0.33}WO_3$, $Na_{0.33}WO_3$, $Na_{0.75}WO_3$, and also mixtures thereof.

In a particular embodiment of the present invention the sole use of $Cs_{0.33}WO_3$ as inorganic IR absorber is quite particularly preferred. Also known are compounds with Cs/W ratios of 0.20 and 0.25.

Surprisingly, moreover, it turned out in this connection that only a certain group of stabilisers is effective, whereas other stabilisers of similar structure are either ineffective or even harmful and further accelerate the decline in the IR absorption. Within the scope of the present invention it could accordingly be shown that phosphorus-based stabilisers in the form of their phosphines prove to be positive and stabilise the IR-absorbing tungstates, whereas the sole use of phosphorus-containing stabilisers of the type of the phosphites, phosphonates or phosphonites proves to be barely effective to ineffective. In the case where use is made of phosphates, phosphoric acid, phosphoric-acid derivatives or corresponding stabilisers that these compounds may contain or form, even a more rapid damage to the tungstates according to the invention occurs.

Phosphines in the sense of the present invention are derived from compounds of the general type $P_nH_{n+2}$, in particular from $PH_3$, wherein preferably all the hydrogen atoms have been replaced by aliphatic and/or aromatic hydrocarbon residues, wherein the aromatic hydrocarbon residues may exhibit further substituents such as alkyl groups, for example. The phosphines may in this case exhibit a phosphorus atom or alternatively several phosphorus atoms bridged via corresponding aliphatic and/or aromatic hydrocarbons.

By the term 'phosphites' in the sense of the present invention, esters of phosphonic acid (often also designated as phosphorous acid esters) with the general structure $P(OR)_3$ are to be understood, where R stands for aliphatic and/or aromatic hydrocarbon residues, whereby the aromatic hydrocarbon residues may exhibit further substituents such as alkyl groups, for example.

By the term 'phosphonates', compounds derived from the basic structure R—$PO(OH)_2$ are to be understood, where R stands for aliphatic and/or aromatic hydrocarbon residues, whereby the aromatic hydrocarbon residues may exhibit further substituents such as alkyl groups, for example. The OH groups of the basic structure may be partly or completely esterified to yield OR functionalities, where R again stands for aliphatic and/or aromatic hydrocarbon residues, whereby the aromatic hydrocarbon residues may exhibit further substituents such as alkyl groups, for example, may be esterified or partly or completely deprotonated, the negative overall charge being balanced out by a corresponding counterion.

By the term 'phosphonites' in the sense of the present invention, esters, in particular diesters of phosphinic acid of the type R—P(OR)$_2$, are to be understood, where R stands for aliphatic and/or aromatic hydrocarbon residues, whereby the aromatic hydrocarbon residues may exhibit further substituents such as alkyl groups, for example. The phosphonites may in this case exhibit a phosphorus atom or alternatively several phosphorus atoms bridged via corresponding aliphatic and/or aromatic hydrocarbons.

By the term 'phosphates' within the scope of the present invention, salts, partial esters or full esters and condensates of phosphoric acid (H$_3$PO$_4$) are to be understood.

The object of the present invention is consequently achieved by a polymer composition that contains
a) a transparent thermoplastic synthetic substance, preferably polycarbonate, polystyrene, aromatic polyesters, such as polyethylene terephthalate (PET), PET-cyclohexanedimethanol copolymer (PETG), polybutylene terephthalate (PBT), cyclic polyolefin or polymethyl methacrylate, more preferably polycarbonate, aromatic polyesters or polymethacrylate, and particularly preferably polycarbonate or mixtures of the named components,
b) at least one inorganic IR absorber from the group of the tungstates, preferentially Cs$_{0.33}$WO$_3$,
c) at least one phosphine compound, preferentially triphenylphosphine (TPP), trialkylphenylphosphine, trinaphthylphosphine or bisdiphenylphosphinoethane, whereby triphenylphosphine (TPP) is particularly preferred.

As the state of the art shows, the stabilising action of phosphines on inorganic IR absorbers is unknown, and it was therefore highly surprising that the IR performance of these systems can be improved over the long term by certain phosphine-based stabilisers.

The problem, underlying the present invention, of the stabilisation of tungstates as inorganic IR stabiliser in polymer compositions is solved moreover through the use of phosphine compounds for the stabilisation, in particular for long-term stabilisation, of the tungstates.

The invention further provides a process for producing the compositions according to the invention as well as the use thereof and products produced therefrom.

The particle diameter of the tungstates according to the invention is preferentially smaller than 200 nm, particularly preferably smaller than 100 nm. The particles are transparent in the visible region of the spectrum, the term 'transparent' meaning that the absorption of these IR absorbers in the visible region of light is low compared with the absorption in the IR region and the IR absorber does not result in a distinctly increased haze or a distinct diminution of the transmission (in the visible region of light) of the composition or of the respective end product.

The tungstates of type b2) exhibit an amorphous, a cubic, tetragonal or hexagonal tungsten-bronze structure, where M preferably stands for H, Cs, Rb, K, Tl, Ba, In, Li, Ca, Sr, Fe and Sn.

For the purpose of producing such materials, tungsten trioxide, tungsten dioxide, a hydrate of a tungsten oxide, tungsten hexachloride, ammonium tungstate or tungstic acid and optionally further salts containing the element M, such as caesium carbonate for example, are, for example, mixed in defined stoichiometric ratios, so that the molar ratios of the individual components are reproduced by the formula M$_x$W$_y$O$_z$. This mixture is subsequently treated at temperatures between 100° C. and 850° C. in a reducing atmosphere, for example an argon/hydrogen atmosphere, and finally the powder obtained is annealed at temperatures between 550° C. and 1200° C. under inert-gas atmosphere.

For the purpose of producing the inorganic IR-absorber nanoparticles according to the invention, the IR absorber can be mixed with the dispersing agents described below and with further organic solvents, such as, for example, toluene, benzene or similar aromatic hydrocarbons, and can be ground in suitable mills, such as, for example, ball mills, subject to addition of zirconium oxide (e.g. with a diameter of 0.3 mm), in order to produce the desired particle-size distribution. The nanoparticles are obtained in the form of a dispersion. After grinding, further dispersing agents may optionally be added. The solvent is removed at elevated temperatures and at reduced pressure. Preferred are nanoparticles that exhibit a mean size smaller than 200 nm, particularly preferably smaller than 100 nm.

The size of the particles can be determined with the aid of transmission electron spectroscopy (TEM). Such measurements in respect of IR-absorber nanoparticles are described, for example, in Adachi et al., J. Am. Ceram. Soc. 2008, 91, 2897-2902.

The production of the tungstates according to the invention is described more precisely in, for example, EP 1 801 815 A1, and they are commercially available, for example, from Sumitomo Metal Mining Co., Ltd. (Japan) under the designation YMDS 874.

For use in transparent thermoplastics, the particles so obtained are dispersed in an organic matrix, for example in an acrylate, and optionally, as described above, ground in a mill using suitable auxiliary substances such as, for example, zirconium dioxide and optionally using organic solvents such as, for example, toluene, benzene or similar hydrocarbons.

Suitable polymer-based dispersing agents are, above all, dispersing agents that exhibit a high light transmission, such as, for example, polyacrylates, polyurethanes, polyethers, polyesters or polyester urethanes and also polymers derived therefrom.

Preferred as dispersing agents are polyacrylates, polyethers and polyester-based polymers, whereby polyacrylates such as, for example, polymethyl methacrylate and polyesters are particularly preferred as high-temperature-stable dispersing agents. Mixtures of these polymers or even acrylate-based copolymers may also be employed. Such dispersing aids and methods for producing tungstate dispersions are described, for example, in JP 2008214596 and also in Adachi et al. J. Am. Ceram. Soc. 2007, 90 4059-4061.

Dispersing agents that are suitable for the present invention are commercially available. In particular, dispersing agents based on polyacrylate are suitable. Such suitable dispersing agents are, for example, available under the trade names EFKA®, for example EFKA® 4500 and EFKA® 4530, from Ciba Specialty Chemicals. Polyester-containing dispersing agents are likewise suitable. They are, for example, available under the trade names Solsperse®, for example Solsperse® 22000, 24000SC, 26000, 27000, from Avecia. Furthermore, polyether-containing dispersing agents are known, for example under the trade names Disparlon® DA234 and DA325 produced by Kusumoto Chemicals. Polyurethane-based systems are also suitable. Polyurethane-based systems are available under the trade names EFKA® 4046, EFKA® 4047 from Ciba Specialty Chemicals. Texaphor® P60 and P63 are corresponding trade names of Cognis.

The quantity of the IR absorber in the dispersing agent amounts to 0.2 wt. % to 50.0 wt. %, preferably 1.0 wt. %-40.0 wt. %, more preferably 5 wt. %-35 wt. %, and most preferably 10 wt. %-30 wt. %, relative to the dispersion of the inorganic IR absorber employed in accordance with the invention. In the overall composition of the ready-to-use IR absorber formulation, in addition to the IR-absorber extrapure substance and the dispersing agent yet further auxiliary substances—such as, for example, zirconium dioxide and also residual solvents such as, for example, toluene, benzene or similar aromatic hydrocarbons—may be contained.

With regard to the quantity of the IR-absorbing inorganic tungstates according to the invention in the polymer compositions according to the invention there are no restrictions of any kind. But the tungstates are ordinarily employed in a quantity of 0.0001 wt. %-10.0000 wt. %, preferably 0.001 wt. %-1.000 wt. % and particularly preferably 0.002 wt. %-0.100 wt. %, calculated as solid content of tungstate in the overall polymer composition.

In a particular embodiment of the invention the quantity of the tungstates according to the invention employed amounts to 0.009 wt. %-0.020 wt. %, preferentially 0.012 wt. % to 0.018 wt. %, again specified as solids content of tungstate in the overall polymer composition. The term 'solids content of tungstate' means in this connection the tungstate as extrapure substance and not a dispersion, suspension or other preparation containing the extrapure substance, whereby the following data for the tungstate content also always relate to this solids content, unless explicitly stated otherwise.

These concentrations preferentially find application for finished parts with thicknesses of 2 mm-8 mm, preferably 3.5 mm-7.0 mm, and particularly preferably 4 mm-6 mm.

In another embodiment, optionally in addition to the tungstates according to the invention further IR absorbers may be used additionally as IR absorbers, whereby, however, the proportion thereof in such a mixture with respect to quantity and/or performance lies in each instance below that of the tungstates described above. In the case of mixtures, in this connection compositions are preferred that contain from two up to and including five, and particularly preferably two or three, different IR absorbers.

The further IR absorber is preferentially selected from the group of the borides and tin oxides, particularly preferably $LaB_6$, or contains antimony-doped tin oxide or indium tin oxide.

In an alternative embodiment of the present invention the polymer composition according to the invention contains no inorganic IR absorber of the metal boride type such as, for example, lanthanum hexaboride, $LaB_6$.

In another preferred embodiment the additional IR absorber(s) exhibit(s) a different absorption spectrum relative to the absorption maxima from the tungstate employed, so that a maximal absorption region is covered by the maxima.

Suitable additional organic infrared absorbers are described by classes of substance in, for example, M. Matsuoka, Infrared Absorbing Dyes, Plenum Press, New York, 1990. Particularly suitable are infrared absorbers from the classes of the phthalocyanines, the naphthalocyanines, the metal complexes, the azo dyes, the anthraquinones, the squaric-acid derivatives, the immonium dyes, the perylenes, the quaterylenes and also the polymethines. Of these, quite particularly suitable are phthalocyanines and naphthalocyanines.

By reason of the improved solubility in thermoplastics, phthalocyanines and naphthalocyanines with sterically demanding side groups are to be preferred, such as, for example, phenyl, phenoxy, alkylphenyl, alkylphenoxy, tert-butyl, (—S-phenyl), —NH-aryl, NH-alkyl and similar groups.

Further inorganic IR absorbers are, for example, substances based on borides or nitrides, such as, for example, lanthanum hexaboride.

Moreover, compounds such as indium oxide that has been doped with 2 atom % to 30 atom %, preferentially with 4 atom % to 12 atom %, tin (ITO) or with 10 atom % to 70 atom % fluorine may be added.

Particularly preferred is the combination with tin oxide by way of further IR absorber that has been doped with 2 atom % to 60 atom % antimony (ATO) or with 10 atom % to 70 atom % fluorine.

Furthermore, particularly suitable is zinc oxide that has been doped with 1 atom % to 30 atom %, preferentially with 2 atom % to 10 atom %, aluminium or with 2 atom % to 30 atom % indium or with 2 atom % to 30 atom % gallium.

Mixtures of the aforementioned infrared absorbers are particularly suitable, since a person skilled in the art can obtain an optimisation of the absorption in the near-infrared region by a targeted selection.

Phosphine compounds in the sense of the invention are all the organic derivatives of phosphorus hydride (phosphine) and salts thereof. With regard to the selection of the phosphines there are no restrictions, the phosphine compounds preferably being selected from the group that comprises aliphatic phosphines, aromatic phosphines and aliphatic/aromatic phosphines.

The phosphine compounds may be primary, secondary and tertiary phosphines. Preferably tertiary phosphines are employed, aromatic phosphines being particularly preferred and tertiary aromatic phosphines being quite particularly preferred.

In a preferred embodiment of the invention, triphenylphosphine (TPP), trialkylphenylphosphine, bisdiphenylphosphinoethane or a trinaphthylphosphine, of which triphenylphosphine (TPP) is quite particularly preferred, or mixtures of these phosphines, is/are employed.

In principle, mixtures of various phosphines may be employed.

In a special embodiment of the present invention the phosphine compounds according to the invention are employed jointly with a phosphite or with a phenolic antioxidant or with a mixture of the two last-named compounds.

In another particular embodiment, prior to being worked into the thermoplastic polymer matrix the IR absorber according to the invention is mixed with the phosphine stabiliser according to the invention or with a mixture containing a phosphine compound according to the invention jointly with a phosphite or with a phenolic antioxidant or with a mixture of the two last-named compounds.

The production and properties of phosphine compounds are known to a person skilled in the art and described, for example, in EP-A 0 718 354 and *Ullmanns Enzyklopädie der Technischen Chemie*, 4th Edn., Vol. 18, pp. 378-398 and Kirk-Othmer, 3rd Edn., Vol. 17, pp. 527-534.

With regard to the quantity of the phosphine compounds contained in the polymer composition there are no restrictions. The phosphines are preferentially employed in a quantity from 0.0001 wt. % to 10.0000 wt. %, particularly preferably from 0.01 wt. % to 0.20 wt. %, relative to the mass of the overall polymer composition. In a particular embodiment of the present invention the phosphines are employed in a quantity from 0.05 wt. % to 0.15 wt. %, relative to the mass of the overall polymer composition. In connection with the charge of the phosphine compound it is to be taken into account that under certain processing conditions, depending on temperature and dwell-time, the substance is oxidised. The oxidised proportion is no longer available for stabilising the tungstate-based inorganic IR absorber. Therefore the number of processing steps and the respective process conditions are to be taken into account.

The quantity of unoxidised phosphine compound in the end product is preferably >0.01 wt. %, more preferably >0.02 wt. %.

Through the use of the aforementioned phosphine stabilisers, the tungstate IR absorbers of the present invention, in particular $Cs_{0.33}WO_3$, in the polymer matrix can be stabilised in the long term, and a decline in the IR absorption can be prevented. Particularly preferably in this case triphenylphosphine (TPP) is employed as stabiliser.

In order to stabilise the thermoplastic matrix, further phosphorus-based stabilisers may be employed, so long as these do not have a negative influence on the effect of the stabilisation described above.

Whereas phosphines evidently stabilise the IR-absorbing tungstates, it has surprisingly turned out that phosphates, phosphoric acid, phosphoric-acid derivatives or corresponding stabilisers that contain or may form these compounds result in a more rapid damage to the tungstates according to the invention, and consequently in a decline in the IR absorption.

Suitable additional stabilisers are phosphites or phenolic antioxidants or mixtures thereof, which can be employed in conjunction with the phosphines described above without negative effects on the durability of the IR absorbers. Commercially available suitable products are, for example, Irgafos® 168 (tris(2,4-di-tert-butylphenyl)phosphite) and Irganox® 1076 (2,6-di-tert-butyl-4-(octadecaneoxycarbonylethyl)phenol), in each instance individually or in combination.

The quantity of optionally employed phosphites preferably amounts to 0.20 wt. %-0.01 wt. %, in particular preferably 0.10 wt. %-0.02 wt. %. The quantity of optionally employed phenolic antioxidants preferably amounts to 0.100 wt. %-0.001 wt. %, particularly preferably 0.050 wt. %-0.005 wt. %.

In a preferred embodiment the polymer composition according to the invention furthermore contains an ultraviolet absorber. Ultraviolet absorbers that are suitable for use in the polymer composition according to the invention are compounds that possess as low a transmission as possible below 400 nm and as high a transmission as possible above 400 nm. Such compounds and the production thereof are known from the literature and are described, for example, in EP-A 0 839 623, WO-A 96/15102 and EP-A 0 500 496. Ultraviolet absorbers that are particularly suitable for use in the composition according to the invention are benzotriazoles, triazines, benzophenones and/or arylated cyanoacrylates.

Particularly suitable ultraviolet absorbers are hydroxybenzotriazoles, such as 2-(3',5'-bis(1,1-dimethylbenzyl)-2'-hydroxyphenyl)benzotriazole (Tinuvin® 234, Ciba Spezialitätenchemie, Basel), 2-(2'-hydroxy-5'-(tert.-octyl)phenyl)benzotriazole (Tinuvin® 329, Ciba Spezialitätenchemie, Basel), 2-(2'-hydroxy-3'-(2-butyl)-5'-(tert.butyl)phenyl)benzotriazole (Tinuvin® 350, Ciba Spezialitätenchemie, Basel), bis(3-(2H-benztriazolyl)-2-hydroxy-5-tert.-octyl)methane, (Tinuvin® 360, Ciba Spezialitätenchemie, Basel), (2-(4,6-diphenyl-1,3,5-triazin-2-yl)-5-(hexyloxy)phenol (Tinuvin® 1577, Ciba Spezialitätenchemie, Basel), and also the benzophenones 2,4-dihydroxybenzophenone (Chimasorb® 22, Ciba Spezialitätenchemie, Basel) and 2-hydroxy-4-(octyloxy)benzophenone (Chimassorb® 81, Ciba, Basel), 2-propenoic acid, 2-cyano-3,3-diphenyl-, 2,2-bis[[(2-cyano-1-oxo-3,3-diphenyl-2-propenyl)oxy]methyl]-1,3-propanediyl ester (9CI) (Uvinul® 3030, BASF AG Ludwigshafen), 2-[2-hydroxy-4-(2-ethylhexyl)oxy]phenyl-4,6-di(4-phenyl)phenyl-1,3,5-triazine (CGX UVA 006, Ciba Spezialitätenchemie, Basel) or tetraethyl-2,2'-(1,4-phenylenedimethylidene)bismalonate (Hostavin® B-Cap, Clariant AG).

Mixtures of these ultraviolet absorbers may also be employed.

With regard to the quantity of the ultraviolet absorber contained in the composition there are no particular restrictions, so long as the desired absorption of UV radiation and also a sufficient transparency of the moulding produced from the composition are guaranteed. According to a preferred embodiment of the invention the composition contains ultraviolet absorbers in a quantity from 0.05 wt. % to 20.00 wt. %, in particular from 0.07 wt. % to 10.00 wt. %, and quite particularly preferably from 0.10 wt. % to 1.00 wt. %.

Transparent thermoplastic synthetic substances in the sense of the invention are, for example, polymerisates of ethylenically unsaturated monomers and/or polycondensates of bifunctional reactive compounds. Examples of transparent thermoplastic polymers are, for example, polycarbonates or copolycarbonates based on diphenols, polyacrylates or copolyacrylates and polymethacrylate or copolymethacrylate such as, for example, polymethyl or copolymethyl methacrylates and also copolymers with styrene such as, for example, transparent polystyrene acrylonitrile (PSAN) or polymers based on ethylene and/or propylene and also aromatic polyesters such as PET, PEN or PETG and transparent thermoplastic polyurethanes. Furthermore, polymers based on cyclic olefins (e.g. TOPAS™, a commercial product of Ticona), polycondensates or copolycondensates of terephthalic acid, such as, for example, polyethylene terephthalates or copolyethylene terephthalates (PET or CoPET) or PETG may also be mixed in.

Mixtures of several transparent thermoplastic polymers are also possible. Preferred are polymethyl methacrylate, aromatic polyesters, polycarbonates or copolycarbonates, whereby polycarbonate is particularly preferred.

Particularly preferred polycarbonates are the homopolycarbonate based on bisphenol A, the homopolycarbonate based on 1,3-bis(4-hydroxyphenyl)-3,3,5-trimethylcyclohexane and the copolycarbonates based on the two monomers bisphenol A and 1,1-bis(4-hydroxyphenyl)-3,3,5-trimethylcyclohexane.

Polycarbonates in the sense of the present invention are both homopolycarbonates and copolycarbonates; the polycarbonates may be linear or branched in known manner.

Production of the polycarbonates is undertaken in known manner from diphenols, carbonic-acid derivatives, where appropriate chain-terminators and branching agents.

Particulars of the production of polycarbonates have been set down in many printed patent specifications for about 40 years. In exemplary manner, let reference be made here only to Schnell, *Chemistry and Physics of Polycarbonates*, Polymer Reviews, Volume 9, Interscience Publishers, New York, London, Sydney 1964, to D. Freitag, U. Grigo, P. R. Müller, H. Nouvertne', BAYER AG, *Polycarbonates* in Encyclopedia of Polymer Science and Engineering, Volume 11, Second Edition, 1988, pages 648-718, and lastly to Drs. U. Grigo, K. Kirchner and P. R. Müller, *Polycarbonate* in Becker/Braun, *Kunststoff-Handbuch*, Volume 3/1, *Polycarbonate, Polyacetale, Polyester, Celluloseester*, Carl Hanser Verlag Munich, Vienna 1992, pages 117-299.

Diphenols that are suitable for the production of the polycarbonates are, for example, hydroquinone, resorcinol, dihydroxydiphenyls, bis(hydroxyphenyl)alkanes, bis(hydroxyphenyl)cycloalkanes, bis(hydroxyphenyl)sulfides, bis(hydroxyphenyl)ethers, bis(hydroxyphenyl)ketones, bis(hydroxyphenyl)sulfones, bis(hydroxyphenyl)sulfoxides, α-α'-bis(hydroxyphenyl)diisopropylbenzenes, phtalimidines derived from isatine derivatives or phenol-phthalein derivatives as well as the ring-alkylated and ring-halogenated compounds thereof.

Preferred diphenols are 4,4'-dihydroxydiphenyl, 2,2-bis(4-hydroxyphenyl)propane, 2,4-bis(4-hydroxyphenyl)-2-methylbutane, 1,1-bis(4-hydroxyphenyl)-p-diisopropylbenzene, 2,2-bis(3-methyl-4-hydroxyphenyl)propane, 2,2-bis(3-chloro-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl)sulfone, 2,4-bis(3,5-dimethyl-4-hydroxyphenyl)-2-methylbutane, 1,1-bis(3,5-dimethyl-4-hydroxyphenyl)-p-diisopropylbenzene, 2,2-bis(3,5-dichloro-4-hydroxyphenyl)propane, 2,2-bis(3,5-dibromo-4-hydroxyphenyl)propane and 1,1-bis(4-hydroxyphenyl)-3,3,5-trimethylcyclohexane.

Particularly preferred diphenols are 2,2-bis(4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, 1,1-bis(4-hydroxyphenyl)cyclohexane and 1,1-bis(4-hydroxyphenyl)-3,3,5-trimethylcyclohexane.

These and further suitable diphenols are described, for example, in U.S. Pat. No. 3,028,635, U.S. Pat. No. 2,999,825, U.S. Pat. No. 3,148,172, U.S. Pat. No. 2,991,273, U.S. Pat. No. 3,271,367, U.S. Pat. No. 4,982,014 and U.S. Pat. No. 2,999,846, in DE-A 1 570 703, DE-A 2 063 050, DE-A 2 036 052, DE-A 2 211 956 and DE-A 38 32 396, in FR-A 1.561.518, in the monograph by H. Schnell, *Chemistry and Physics of Polycarbonates*, Interscience Publishers, New York 1964, and also in JP-A 62039/1986, JP-A 62040/1986 and JP-A 105550/1986.

In the case of the homopolycarbonates, only one diphenol is employed; in the case of the copolycarbonates, several diphenols are employed.

Suitable carbonic-acid derivatives are, for example, phosgene or diphenyl carbonate.

Suitable chain-terminators which may be employed in the production of the polycarbonates are both monophenols and monocarboxylic acids. Suitable monophenols are phenol itself, alkylphenols such as cresols, p-tert.-butylphenol, cumylphenol, p-n-octylphenol, p-isooctylphenol, p-n-nonylphenol and p-isononylphenol, halophenols such as p-chlorophenol, 2,4-dichlorophenol, p-bromophenol and 2,4,6-tribromophenol, 2,4,6-triiodophenol, p-iodophenol, as well as mixtures thereof.

Preferred chain-terminators are phenol, cumylphenol and/or p-tert.-butylphenol.

Suitable monocarboxylic acids are, moreover, benzoic acid, alkylbenzoic acids and halobenzoic acids.

Preferred chain-terminators are furthermore the phenols that are substituted once or repeatedly with C1 to C30 alkyl residues, linear or branched, preferably unsubstituted or substituted with tert.-butyl.

The quantity of chain-terminator to be employed preferably amounts to 0.1 mol % to 5 mol %, relative to moles of diphenols employed in the given case. Addition of the chain-terminators may be undertaken before, during or after the phosgenation.

Suitable branching agents are the trifunctional or more than trifunctional compounds known in polycarbonate chemistry, in particular those with three or more than three phenolic OH groups.

Suitable branching agents are, for example, phloroglucinol, 4,6-dimethyl-2,4,6-tri(4-hydroxyphenyl)heptene-2,4,6-dimethyl-2,4,6-tri(4-hydroxyphenyl)heptane, 1,3,5-tri(4-hydroxyphenyl)benzene, 1,1,1-tri(4-hydroxyphenyl)ethane, tri-(4-hydroxyphenyl)phenylmethane, 2,2-bis[4,4-bis(4-hydroxyphenyl)cyclohexyl]propane, 2,4-bis(4-hydroxyphenylisopropyl)phenol, 2,6-bis(2-hydroxy-5'-methyl-benzyl)-4-methylphenol, 2-(4-hydroxyphenyl)-2-(2,4-dihydroxyphenyl)propane, hexa(4(4-hydroxyphenylisopropyl)phenyl)orthoterephthalic acid ester, tetra(4-hydroxyphenyl)methane, tetra(4-(4-hydroxyphenylisopropyl)phenoxy)methane and 1,4-bis((4',4''-dihydroxytriphenyl)methyebenzene and also 2,4-dihydroxybenzoic acid, trimesic acid, cyanuric chloride and 3,3-bis(3-methyl-4-hydroxyphenyl)-2-oxo-2,3-dihydroindole.

The quantity of the branching agents to be optionally employed preferably amounts to 0.05 mol % to 2.00 mol %, again relative to moles of diphenols employed in the given case.

The branching agents may either be charged with the diphenols and the chain-terminators in the aqueous alkaline phase or added prior to the phosgenation, dissolved in an organic solvent. In the case of the transesterification process, the branching agents are employed together with the diphenols.

The aromatic polycarbonates of the present invention have weight-average molecular weights Mw (ascertained by gel permeation chromatography and calibration with polycarbonate calibration) between 5000 and 200,000, preferentially between 10,000 and 80,000 and particularly preferably between 15,000 and 40,000 (this corresponds roughly to between 12,000 and 330,000, preferentially between 20,000 and 135,000 and particularly preferably between 28,000 and 69,000, ascertained by calibration by means of polystyrene standard).

The polymer compositions according to the invention may contain, in addition to the stabilisers according to the invention, further customary polymer additives, such as, for example, the antioxidants, mould-release agents, flameproofing agents, colouring agents, thermostabilisers, UV stabilisers or optical brighteners as described in EP-A 0 839 623, WO-A 96/15102, EP-A 0 500 496 or *Plastics Additives Handbook*, Hans Zweifel, 5th Edition 2000, Hanser Verlag, Munich), in the customary quantities for the respective thermoplastics, whereby, in a special embodiment of the invention, of the named further customary polymer additives which are optionally contained colouring agents are particularly preferred.

The further polymer additives are preferably employed in quantities from 0.0 wt. % up to 5.0 wt. %, more preferred 0.1 wt. % to 1.0 wt. %, in each instance relative to the quantity of the respective overall polymer composition. Mixtures of several added substances are also suitable.

In a particular embodiment of the present invention the polymer composition is free from phosphates, phosphoric acid, phosphoric-acid derivatives or corresponding stabilisers which these compounds contain or may form.

Colouring agents or pigments in the sense of the present invention are sulfurous pigments such as cadmium red and cadmium yellow, iron-cyanide-based pigments such as Prussian blue, oxide pigments such as titanium dioxide, zinc oxide, red iron oxide, black iron oxide, chromium oxide, titanium yellow, zinc/iron-based brown, titanium/cobalt-based green, cobalt blue, copper/chromium-based black and copper/iron-based black or chromium-based pigments such as chromium yellow, phthalocyanine-derived dyes such as copper phthalocyanine blue and copper phthalocyanine green, condensed polycyclic dyes and pigments such as azo-based dyes and pigments (e.g. nickel azo yellow), sulfur indigo dyes, perynone-based, perylene-based, quinacridone-derived, dioxazine-based, isoindolinone-based and quinophthalone-derived derivatives, anthraquinone-based heterocyclic systems.

Concrete examples of commercial products are, for example, MACROLEX® Blau RR, MACROLEX® Violett 3R, MACROLEX® Violett B (Lanxess AG, Germany), Sumiplast® Violett RR, Sumiplast® Violett B, Sumiplast® Blau OR, (Sumitomo Chemical Co., Ltd.), Diaresin® Violett D, Diaresin® Blau G, Diaresin® Blau N (Mitsubishi Chemical Corporation), Heliogen® Blau or Heliogen® Grün (BASF AG, Germany).

Of these, cyanine derivatives, quinoline derivatives, anthraquinone derivatives, phthalocyanine derivatives are preferred.

Particularly suitable mould-release agents for the compositions according to the invention are, for example, pentaerythritol tetrastearate (PETS) or glycerol monostearate (GMS).

Methods for producing the polymer compositions according to the invention are known to a person skilled in the art.

Production of the polymer compositions according to the invention containing a thermoplastic synthetic substance, an inorganic IR absorber from the group of the tungsten compounds, a phosphine compound and optionally further customary polymer additives is undertaken with standard incorporation processes by bringing together, mixing and homogenising the individual constituents, whereby in particular the homogenisation preferably takes place in the melt subject to the action of shear forces. The bringing-together and mixing are optionally undertaken prior to the homogenisation of the melt, using powder premixes.

Use may also be made of premixes that have been produced from solutions of the components of the mixture in suitable solvents, homogenisation being optionally effected in solution and the solvent being subsequently removed.

In particular in this connection the IR absorbers, phosphine compounds, ultraviolet absorbers and other additives of the composition according to the invention may be introduced by known processes or as master batch.

The use of master batches is preferred, in particular, for the purpose of introducing the IR absorber, whereby, in particular, use is made of master batches based on polycarbonate, into which the IR absorbers have been charged in the form of a ready-to-use IR-absorber formulation containing dispersing agents, preferentially polyacrylate-based, polyether-based or polyester-based dispersing agents, of these preferentially high-temperature-stable dispersing agents, such as a polyacrylate (homopolymer or copolymer), such as, for example, polymethyl methacrylate, and/or polyesters or mixtures thereof, furthermore containing auxiliary substances such as, for example, zirconium dioxide and optionally residual solvents such as, for example, toluene, benzene or similar aromatic hydrocarbons. Through the use of these master batches in combination with the corresponding IR absorber formulations, an agglomeration of the IR absorber in the polymer composition is effectively prevented.

In this connection the composition can be brought together, mixed, homogenised and subsequently extruded in customary devices such as screw extruders (for example, twin-screw extruders), kneaders, Brabender mills or Banbury mills. After the extrusion the extrudate can be cooled and comminuted. Individual components may also be premixed, and then the remaining initial substances may be added individually and/or likewise mixed.

In a particular embodiment, prior to being worked into the thermoplastic polymer matrix the IR absorber according to the invention is mixed with the phosphine stabiliser according to the invention or with a mixture containing a phosphine compound according to the invention jointly with a phosphite or with a phenolic antioxidant or with a mixture of the two last-named compounds so as to form a master batch, the mixing preferably taking place in the melt subject to the action of shear forces (for example, in a kneader or twin-screw extruder). This process offers the advantage that the IR absorber is also already protected during the compounding, and damage to the same is avoided. For the purpose of producing the master batch, by way of polymer matrix the thermoplastic synthetic substance that also constitutes the main component of the final overall polymer composition is preferably chosen.

The master batch produced in this way contains
a. 85.00 wt. %-98.89 wt. %, preferably 93.00 wt. %-98.89 wt. % of a transparent thermoplastic synthetic substance;
b. 0.1 wt. %-2.0 wt. % tungstate as inorganic IR absorber, preferentially $Cs_{0.33}WO_3$; and
c. 1.0 wt. %-4.8 wt. % dispersing agent
d. 0.01 wt. %-0.20 wt. % of a phosphine-based stabiliser, preferentially triphenylphosphine (TPP),
e. optionally 0-8.0 wt. % of at least one further auxiliary substance and/or additive, such as, for example, zirconium dioxide, the sum of components a-e adding up to 100 wt. %.

In a preferred embodiment the inorganic IR absorber is present in an acrylate matrix. In another preferred embodiment the transparent thermoplastic synthetic substance is a polycarbonate. Another preferred embodiment provides triphenylphosphines (TPP) as stabiliser.

The polymer compositions according to the invention may be processed into products or mouldings, by, for example, the polymer compositions firstly being extruded into granulate as described and by this granulate being processed into various products or mouldings in known manner by suitable processes.

In this connection the compositions according to the invention may, for example, be converted by hot pressing, spinning, blow moulding, thermoforming, extruding or injection moulding into products or mouldings, shaped objects such as toy parts, fibres, films, tapes, sheets such as solid sheets, multi-wall sheets, twin-wall sheets or corrugated sheets, vessels, tubes or other profiles. Also of interest is the use of multi-layer systems. Application may take place at the same time as or immediately after the shaping of the base bodies, for example by coextrusion or by multi-component injection moulding. But application onto the ready-moulded base body may also take place, for example, by lamination with a film or by coating with a solution.

Sheets consisting of base layer and optional top layer(s) are, however, preferably produced by (co)extrusion.

For the purpose of extrusion, the polymer composition—optionally pretreated, for example by means of drying—is supplied to the extruder and fused in the plasticising system of the extruder. The plastic melt is then pressed through a slit die or multi-wall-sheet die and in the process is deformed, brought into the desired definitive shape in the roller gap of a smoothing calender and fixed in shape by reciprocal cooling on smoothing rollers and in the ambient air. The temperatures necessary for extruding the polymer composition are set, whereby the manufacturer's instructions can ordinarily be followed. If the polymer compositions contain, for example, polycarbonates with high melt viscosity, these are normally processed at melt temperatures from 260° C. to 320° C.; the cylinder temperatures of the plasticising cylinder and also the die temperatures are adjusted correspondingly.

Through the use of one or more subsidiary extruders and a multi-manifold die or optionally suitable melt adapters upstream of a slit die, thermoplastic melts of various compositions can be stacked, and consequently multi-layer sheets or films can be generated (for the coextrusion, see, for example, EP-A 0 110 221, EP-A 0 110 238 and EP-A 0 716 919; for details of the process concerning the adapter and the die, see Johannaber/Ast: *Kunststoff-Maschinenführer*, Hanser Verlag, 2000 and in *Gesellschaft Kunststofftechnik:, Coextrudierte Folien and Platten: Zukunftsperspektiven, Anforderungen, Anlagen and Herstellung, Qualitätssicherung*, VDI-Verlag, 1990).

Products or mouldings that are preferred in accordance with the invention are sheets, films, glazings, for example car windows, car sunroofs, panoramic roofs, roofings or building glazings that contain the compositions according to the invention. In this connection, use may also be made of twin-wall sheets or multi-wall sheets. By way of further components of the products according to the invention, in addition to the compositions according to the invention further material parts, for example, may be contained in the products according to the invention. For example, glazings may exhibit packing materials at the edge of the glazings. Roofings may, for example, exhibit metal components such as screws, metal pins or similar, which may serve for fastening or guiding (in the case of folding roofs or sliding roofs) the roofing elements. Furthermore, other materials can be combined with the compositions according to the invention, for example in two-component injection moulding. Accordingly, the corresponding component with IR-absorbing properties can be provided with an edge which, for example, serves for adhesion bonding.

The articles containing the polymer composition of the present invention have haze values of less than 5%, preferably less than 4%.

Furthermore, the articles exhibit a $T_{DS}$ value of preferably <80% ($T_{DS}$: Direct Solar Transmittance; values are measured in respect of optical colour-sample sheets with a thickness of 4 mm. The calculation of the total transmission $T_{DS}$ is carried out in accordance with ISO 13837, computational convention "A").

In a particular embodiment the articles are coated from the composition of the present invention. This coating serves for protecting the thermoplastic material against general weathering influences (for example, damage by sunlight) and also against mechanical impairment of the surface (e.g. scratching), and consequently increases the durability of the correspondingly finished articles.

It is known that polycarbonates can be protected against UV radiation by means of various coatings. Ordinarily these coatings contain UV absorbers. These layers also increase the scratch resistance of the corresponding article. The articles arising out of the present invention may bear single-layer or multi-layer systems. They may be coated on one side or on both sides. In a preferred embodiment the article contains a scratch-resistant lacquer containing UV absorbers.

In the case of glazing materials the article bears at least one scratch-resistant or anti-reflection coating on at least one side.

Production of the coating, for example an anti-reflection coating, may be undertaken via various methods. For example, a coating may be effected via various methods of vapour deposition, for example via electron-beam processes, resistance heating and also via plasma deposition or various sputtering methods such as high-frequency sputtering, magnetron sputtering, ion-beam sputtering etc., ion plating by means of DC, RF, HCD methods, reactive ion plating etc. or chemical vapour deposition. Furthermore, an anti-reflection coating may also be applied from solution. Accordingly, via a dispersion of a metal oxide with high refractive index, such as $ZrO_2$, $TiO_2$, $Sb_2O_5$ or $WO_3$, in a silicone-based lacquer a corresponding coating solution can be produced that is suitable for coating plastic articles, and can be cured thermally or in UV-assisted manner.

Various methods are known in order to produce a scratch-resistant coating on plastic articles. For example, use may be made of epoxy-based, acrylic-based, polysiloxane-based, colloidal-silica-gel-based, or inorganic/organic(hybrid systems)-based lacquers. These systems may be applied via, for example, dipping processes, spin coating, spray processes or flow coating. Curing may be undertaken thermally or by means of UV irradiation. Use may be made of single-layer or multi-layer systems. The scratch-resistant coating may, for example, be applied directly or after preparation of the substrate surface with a primer. Furthermore, a scratch-resistant coating may be applied via plasma-assisted polymerisation processes, for example via an $SiO_2$ plasma. Anti-fogging or anti-reflection coatings may likewise be produced via plasma processes. Moreover, via certain injection-moulding processes—such as, for example, the rear injection of surface-treated films—it is possible to apply a scratch-resistant coating onto the resulting moulding. Various additives—such as, for example, UV absorbers derived, for example, from triazoles or triazines—may be present in the scratch-resistant layer. Furthermore, IR absorbers of organic or inorganic nature may be contained. These additives may be contained in the scratch-resistant lacquer itself or in the primer layer. The thickness of the scratch-resistant layer amounts to 1 μm-20 μm, preferably 2 μm-15 μm. Below 1 μm the durability of the scratch-resistant layer is insufficient. Above 20 μm, cracks in the lacquer occur more frequently. After complete processing of the injection-moulded article, the base material according to the invention, which is described in the present invention, is preferably provided with a scratch-resistant and/or anti-reflection layer described above, since the preferred field of application lies in the domain of window glazing or automobile glazing.

For polycarbonates, a primer containing UV absorber is preferably employed, in order to improve the adhesion of the scratch-resistant lacquer. The primer may contain further stabilisers such as, for example, HALS systems (stabilisers based on sterically hindered amines), coupling agents, flow aids. The respective resin may be selected from a large number of materials and is described, for example, in *Ullmann's Encyclopedia of Industrial Chemistry*, $5^{th}$ Edition, Vol. A18, pp. 368-426, VCH, Weinheim 1991. Polyacrylates, polyurethanes, phenol-based, melamine-based, epoxy and alkyd systems or mixtures of these systems may be employed. The resin is usually dissolved in suitable solvents, frequently in alcohols. Depending on the chosen resin, curing may be undertaken at room temperature or at elevated temperatures. Temperatures between 50° C. and 130° C. are preferably employed, frequently after a major part of the solvent has briefly been removed at room temperature. Commercially available systems are, for example, SHP470, SHP470FT2050 and SHP401 produced by Momentive Performance Materials. Such coatings are described, for example, in U.S. Pat. No. 6,350,512 B1, U.S. Pat. No. 5,869,185, EP 1 308 084, WO 2006/108520.

Scratch-resistant lacquers (hard coats) are preferably constructed from siloxanes and preferably contain UV absorbers. They are preferably applied via dipping processes or flow processes. Curing is undertaken at temperatures of 50° C.-130° C. Commercially available systems are, for example, AS4000, SHC5020 and AS4700 from Momentive Performance Materials. Such systems are described, for example, in U.S. Pat. No. 5,041,313, DE 31 21 385, U.S. Pat. No. 5,391, 795, WO 2008/109072. The synthesis of these materials is usually undertaken via condensation of alkoxysilanes and/or alkylakoxysilanes subject to acid catalysis or base catalysis. Optionally, nanoparticles may be worked in. Preferred solvents are alcohols such as butanol, isopropanol, methanol, ethanol and mixtures thereof.

Instead of combinations of primer and scratch-resistant coating, one-component hybrid systems may be employed. These are described, for example, in EP 0 570 165 or WO 2008/071363 or DE 28 04 283. Commercially available hybrid systems are available, for example, under the names PHC587 or UVHC 3000 from Momentive Performance Materials.

All the references described above are incorporated by reference in their entireties for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

EXAMPLES

In the following, the invention will be described in more detail on the basis of exemplary embodiments, whereby the methods of determination described here find application for all corresponding quantities in the present invention, unless described to the contrary.

Determination of the melt volume-flow rate (MVR) is undertaken in accordance with ISO 1133 (at 300° C.; 1.2 kg). Determination of the $T_{DS}$ Value (Direct Solar Transmittance):

The measurements of transmission and reflection were carried out in a Perkin Elmer Lambda 900 spectral photometer with photometer ball (i.e. determination of the overall transmission by measurement both of the diffuse and direct transmission and of the diffuse and direct reflection). All values were determined from 320 nm to 2300 nm.

The computation of the overall transmission $T_{DS}$ was carried out in accordance with ISO 13837, computational convention "A".

Thermal storage of the specimens is undertaken in a circulating-air oven. The thermal storage was undertaken at 110° C. From the measured values the percentage change in the corresponding values was calculated. The results are presented in Table 1.

For the purpose of producing the test pieces, use is made of additive-free polycarbonate Makrolon 2608 (linear bisphenol-A polycarbonate) produced by Bayer MaterialScience with a melt volume index (MVR) of 12 cm³/10 min at 300° C. and 1.2 kg loading according to ISO 1133.

The compounding of the additives was undertaken in a twin-screw extruder produced by KrausMaffei Berstorff, type ZE25, at a casing temperature of 260° C. and at a melt temperature of 270° C. and at a rotary speed of 100 rpm with the quantities of additives specified in Table 1.

The granulate is dried in a vacuum at 120° C. for 3 hours and subsequently processed in an injection-moulding machine of the type Arburg 370 with a 25 injection unit at a melt temperature of 300° C. and at a tool temperature of 90° C. so as to form colour-sample sheets having the dimensions 60 mm×40 mm×4 mm.

A caesium tungstate ($Cs_{0.33}WO_3$) dispersion (YMDS 874 produced by Sumitomo Metal Mining, Japan) is employed as IR absorber, the solids content of caesium tungstate of the dispersion amounting to 25 wt. %. The weight data in the Examples relate to the caesium tungstate as extrapure substance.

By way of stabilisers for stabilising the inorganic IR absorber, the following compounds were employed:

T1: triphenylphosphine (TPP, Sigma-Aldrich, 82018 Taufkirchen, Germany)

T2: tris(2,4-di-tert-butylphenyl)phosphite (Irgafos® 168 produced by Ciba Specialty Chemicals, Basel, Switzerland).

T3: 1,2-bis(diphenyphosphino)ethane (Sigma-Aldrich, 82018 Taufkirchen, Germany)

T4: tri-o-tolylphosphine (Sigma-Aldrich, 82018 Taufkirchen, Germany)

Example 1

Reference Example

Makrolon® 2608 is compounded with 0.015 wt. % caesium tungstate, $Cs_{0.33}WO_3$, (corresponds to 0.060 wt. % YMDS 874 dispersion), as described above. The results of the thermal storage are listed in Table 1.

Example 2

Reference Example

Makrolon® 2608 is compounded with 0.015 wt. % caesium tungstate, $Cs_{0.33}WO_3$, (corresponds to 0.060 wt. % YMDS 874 dispersion), and also 0.1 wt. % Irgafos 168 as described above. The results of the thermal storage are listed in Table 1.

Example 3

According to the Invention

Makrolon® 2608 is added to 0.015 wt. % caesium tungstate, $Cs_{0.33}WO_3$, (corresponds to 0.060 wt. % YMDS 874 dispersion), and also 0.1 wt. % 1,2-bis(diphenyphosphino)ethane under the conditions described above.

Example 4

According to the Invention

Makrolon® 2608 is compounded with 0.015 wt. % caesium tungstate, $Cs_{0.33}WO_3$, (corresponds to 0.060 wt. % YMDS 874 dispersion), and also 0.1 wt. % triphenylphosphine (TPP) as described above. The results of the thermal storage are listed in Table 1.

Example 5

According to the Invention

Makrolon® 2608 is added to 0.015 wt. % caesium tungstate, $Cs_{0.33}WO_3$, (corresponds to 0.060 wt. % YMDS 874 dispersion), and also 0.1 wt. % tri-o-tolylphosphine under the conditions described above.

TABLE 1

Change in the IR properties after thermal storage

| Example No. | Stabiliser employed | $\Delta T_{DS}$ (500 h) | $\Delta T_{DS}$ (1000 h) |
|---|---|---|---|
| 1 (reference) | — | 4.6 | 5.1 |
| 2 (reference) | T2 | 4.0 | 4.8 |
| 3 (according to the invention) | T3 | 2.3 | 2.6 |
| 4 (according to the invention) | T1 | 2.0 | 2.0 |
| 5 (according to the invention) | T4 | 2.1 | 2.6 |

TABLE 2

Change in the IR properties after thermal storage in %

| Example No. | Stabiliser employed | $\Delta T_{DS}$ (500 h) [%] | $\Delta T_{DS}$ (1000 h) [%] |
|---|---|---|---|
| 1 (reference) | — | 8.5 | 9.6 |
| 2 (reference) | T2 | 7.6 | 9.1 |
| 3 (according to the invention) | T3 | 4.6 | 5.2 |
| 4 (according to the invention) | T1 | 3.8 | 3.8 |
| 5 (according to the invention) | T4 | 3.9 | 4.8 |

The specimens produced from the compositions according to the invention exhibit a only a minor change in the $\Delta T_{DS}$ compared with the compositions not according to the invention. Even after 1000 h of thermal ageing at 110° C., the compositions according to the invention exhibit good IR-absorption properties. Surprisingly, the addition of other thermostabilisers that are not based on phosphine results in no clear improvement in the IR-absorption properties (Example 2). The $T_{DS}$ value of the compositions according to the invention increases distinctly less after thermal storage compared with the initial value prior to thermal storage than that of the reference examples, signifying a better IR-absorption property after the thermal storage.

What is claimed:

1. A polymer composition comprising:
   a) a transparent thermoplastic synthetic substance;
   b) an inorganic IR absorber comprising caesium tungstate; and
   c) a phosphine-based stabiliser;
   wherein the phosphine-based stabiliser comprises a compound selected from the group consisting of triphenylphosphine, trialkylphenylphosphine, bisdiphenylphosphinoethane, trinaphthylphosphine, and mixtures thereof and is present in an amount of from 0.01 wt. % to 0.20 wt. %, relative to the overall composition.

2. The composition according to claim 1, wherein the infrared absorber with a solids content based on tungstate is present in an amount of from 0.0001 wt. %-10 wt. %, relative to the overall composition.

3. The composition according to claim 1, wherein the transparent thermoplastic synthetic substance is selected from the group consisting of polymethyl methacrylates, polycarbonates, and copolycarbonates.

4. The composition according to claim 1, wherein the composition comprises at least one further IR absorber.

5. The composition according to claim 4, wherein said at least one further IR absorber is selected from the group consisting of borides and tin oxides.

6. The composition according to claim 1, wherein the composition further comprises a compound selected from the group consisting of ultraviolet absorbers, colouring agents, mould-release agents, flameproofing agents, thermostabilisers, and combinations thereof.

7. A master batch comprising
   a) from 85.00 wt. % to 98.89 wt. % of a transparent thermoplastic synthetic substance;
   b) from 0.1 wt. % to 2.0 wt. % of an inorganic IR absorber comprising tungstate;
   c) from 1.0 wt. % to 4.8 wt. % of a dispersing agent;
   d) from 0.01 wt. % to 0.20 wt. % of a phosphine-based stabiliser;
   e) from 0 to 8.0 wt. % of at least one further auxiliary substance and/or additive;
   wherein, the sum of components a) through e) add up to 100 wt. %.

8. The master batch according to claim 7, wherein the transparent thermoplastic synthetic substance is present an amount of 93.00 wt % to 98.89 wt. %.

9. The master batch according to claim 7, wherein the inorganic IR absorber comprising tugnstate is $Cs_{0.33}WO_3$.

10. The master batch according to claim 7, wherein the phosphine-based stabiliser is triphenylphoshine.

11. The master batch according to claim 7, wherein the at least one further auxiliary substance and/or additive comprises zirconium dioxide.

12. The master batch according to claim 7, wherein the inorganic IR absorber is present in an acrylate matrix; the transparent thermoplastic synthetic substance is a polycarbonate; and the stabiliser is triphenylphosphine.

13. A polymer composition comprising:
   a) a transparent thermoplastic synthetic substance;
   b) an inorganic IR absorber comprising tungstate;
   c) a phosphine-based stabiliser; and
   d) a phosphite-based stabiliser.

14. An automobile glazing or an architectural glazing comprising the polymer according to claim 1.

15. A process for producing a polymer composition, comprising:
   a) producing a master batch comprising:
      i) a transparent thermoplastic synthetic substance;
      ii) an IR absorber comprising a tungstate in an acrylate matrix; and
      iii) a phosphine-based stabiliser;
   b) mixing the master batch in an extruder, wherein the transparent thermoplastic synthetic substance is fused during mixing.

16. The polymer composition of claim 1, wherein the phosphine-based stabiliser stabilises the inorganic IR absorber comprising caesium tungstate.

* * * * *